United States Patent
Rashley et al.

(10) Patent No.: US 11,427,492 B2
(45) Date of Patent: Aug. 30, 2022

(54) MULTI-CHAMBER SUBMERGED COMBUSTION MELTER AND SYSTEM

(71) Applicant: Owens-Brockway Glass Container Inc., Perrysburg, OH (US)

(72) Inventors: Shane T. Rashley, Bowling Green, OH (US); Zhongming Wang, Ypsilanti, MI (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 319 days.

(21) Appl. No.: 16/509,128

(22) Filed: Jul. 11, 2019

(65) Prior Publication Data
US 2021/0009457 A1    Jan. 14, 2021

(51) Int. Cl.
  *C03B 5/235*   (2006.01)
  *C03B 5/44*    (2006.01)
  *F23C 3/00*    (2006.01)

(52) U.S. Cl.
  CPC .......... *C03B 5/2353* (2013.01); *C03B 5/2356* (2013.01); *C03B 5/44* (2013.01); *F23C 3/004* (2013.01); *C03B 2211/23* (2013.01)

(58) Field of Classification Search
  CPC .......... C03B 5/182; C03B 5/2356; C03B 5/44
  See application file for complete search history.

(56) References Cited

U.S. PATENT DOCUMENTS

| | | | | |
|---|---|---|---|---|
| 2,119,948 A | * | 6/1938 | Blau | ............ C03B 5/182 65/135.2 |
| 2,119,949 A | * | 6/1938 | Blau | ............ C03B 5/182 65/135.2 |
| 2,512,761 A | | 6/1950 | Arbeit | |
| 2,686,820 A | | 4/1954 | Arbeit et al. | |
| 4,632,687 A | | 12/1986 | Kunkle et al. | |
| 4,752,938 A | | 6/1988 | Palmquist | |

(Continued)

FOREIGN PATENT DOCUMENTS

| | | |
|---|---|---|
| CN | 102050561 A | 5/2011 |
| CN | 103570218 A | 2/2014 |

(Continued)

OTHER PUBLICATIONS

Pioro et al., "Advanced Melting Technologies", Ceramic Engineering and Science Proceedings • Nov. 2013, 422 pages. (Year: 2013).*

(Continued)

*Primary Examiner* — Lisa L Herring

(57) ABSTRACT

A submerged combustion melter and system are disclosed. The submerged combustion melter includes a bottom wall, at least one side wall extending upwardly from the bottom wall, a crown extending inwardly with respect to the at least one side wall and over the bottom wall to establish a melting chamber, an exhaust port configured to exhaust gas from the melting chamber, at least one baffle extending from the at least one side wall to divide the melting chamber into melting sub-chambers that share the exhaust port, at least one inlet configured for introducing a glass batch into the submerged combustion melter, and at least one outlet configured to remove molten glass from the at least one melting chamber.

56 Claims, 6 Drawing Sheets

(56) References Cited

U.S. PATENT DOCUMENTS

| | | | |
|---|---|---|---|
| 5,613,994 A * | 3/1997 | Muniz | C03B 5/20 |
| | | | 65/339 |
| 6,401,492 B1 | 6/2002 | Nattermann | |
| 8,196,432 B2 | 6/2012 | Jacques et al. | |
| 8,707,740 B2 | 4/2014 | Huber et al. | |
| 9,145,319 B2 | 9/2015 | Mobley et al. | |
| 9,776,901 B2 | 10/2017 | Huber et al. | |
| 9,776,904 B2 | 10/2017 | Gullinkala et al. | |
| 2006/0105899 A1 | 5/2006 | Jacques et al. | |
| 2008/0276652 A1 | 11/2008 | Bauer et al. | |
| 2009/0176639 A1 | 7/2009 | Jacques et al. | |
| 2011/0236846 A1 | 9/2011 | Rue et al. | |
| 2013/0086950 A1 | 4/2013 | Huber et al. | |
| 2014/0090423 A1 | 4/2014 | Charbonneau et al. | |
| 2015/0283605 A1 * | 10/2015 | Takahashi | F27D 27/00 |
| | | | 266/234 |
| 2016/0185642 A1 | 6/2016 | DeMott et al. | |
| 2017/0107139 A1 * | 4/2017 | Baker | F23G 5/085 |
| 2018/0057387 A1 * | 3/2018 | Faulkinbury | C03B 5/2356 |

FOREIGN PATENT DOCUMENTS

| | | |
|---|---|---|
| FR | 1120864 A | 7/1956 |
| KR | 20030069778 A | 8/2003 |
| SU | 508489 A1 | 3/1976 |

OTHER PUBLICATIONS

International Search Report and Written Opinion, Int. Application No. PCT/US2020/040853, Int. Filing Date: Jul. 6, 2020, Applicant: Owens-Brockway Glass Container Inc., dated Oct. 13, 2020.

L. S. Pioro, et al., "Advanced Melting Technologies with Submerged Combustion", p. 52, Copyright 2010.

* cited by examiner

MULTI-CHAMBER SUBMERGED COMBUSTION MELTER AND SYSTEM

This patent application discloses devices for glass manufacturing, and more particularly, devices for melting a glass supply in a furnace or melter.

BACKGROUND

Submerged combustion melting ("SCM") is based on enhancing heat transfer by mixing combustible fuels and oxidants with raw glass material and firing the fuels and oxidants under the surface of and directly into the glass material to be melted. The contact between the raw glass material and the combusting fuels and oxidants generates a bubbling bath of molten glass with high rates of mass and heat transfer.

SCM furnaces or melters can have an inlet in a furnace wall, usually near a roof or top surface, for delivering a glass batch into the furnace to be melted into molten glass and can have an outlet for removing molten glass. SCM furnaces can operate at high melting temperatures of 1000° C. to 2000° C. or more.

BRIEF SUMMARY OF THE DISCLOSURE

The present disclosure embodies a number of aspects that can be implemented separately from or in combination with each other.

A submerged combustion melter in accordance with one aspect of the disclosure includes a bottom wall, at least one side wall extending upwardly from the bottom wall, a crown extending inwardly with respect to the at least one side wall and over the bottom wall to establish a melting chamber, an exhaust port configured to exhaust gas from the melting chamber, at least one baffle extending inwardly from the at least one side wall to divide the melting chamber into at least two melting sub-chambers that share the exhaust port, at least one inlet configured for introducing a glass batch to the submerged combustion melter, at least one outlet configured to remove molten glass from the at least one melting chamber, and an exhaust port configured to exhaust gas from the melting sub-chambers, where the melting sub-chambers are configured to direct product flow in an undulating flow path between the at least one inlet and the at least one outlet.

A submerged combustion melter system in accordance with one aspect of the disclosure includes a submerged combustion melter and at least one burner proximate to the submerged combustion melter. The submerged combustion melter and system disclosed herein provide a melter with a series of melting sub-chambers that direct molten glass flow in an undulating flow path and provide one exhausting system for the series of melting sub-chambers.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

Figure 1A:
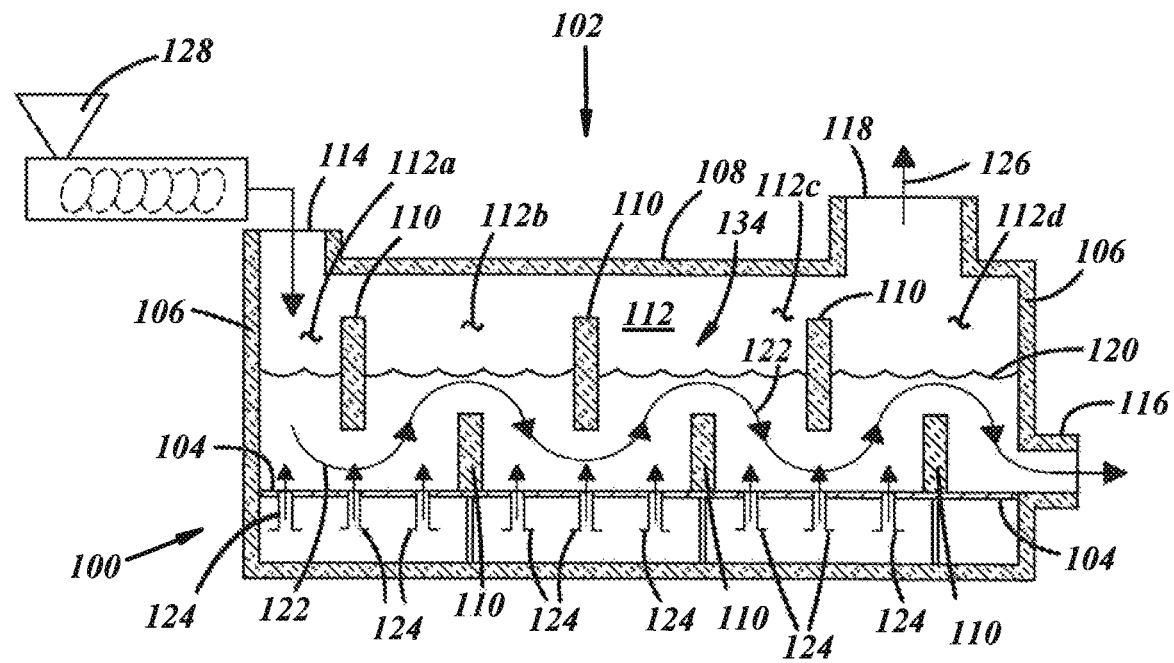
FIG. 1A is a schematic cross-sectional view illustrating a submerged combustion melter having at least one baffle that creates a series of melting sub-chambers with a single exhaust system, a vertically undulating flow path, and an outlet below melt-level, in accordance with an illustrative embodiment of the present disclosure.

A general object of the present disclosure, in accordance with at least one aspect of the disclosure, is to provide a submerged combustion melter that includes at least one baffle or skimmer for changing molten glass batch flow paths and for better control of the batch flow inside the melter. The baffle(s)/skimmer(s) can increase the batch minimum residence time by guiding the batch material flow. Additionally, the baffle(s)/skimmer(s) direct the flow of the raw batch materials and molten glass within the melter to attain the residence time needed for melting of the raw materials, which reduces or eliminates the short-circuiting of the un-melted raw batch materials from the inlet to the outlet, so that undissolved silica or other raw batch materials will not exit the melter along with the molten glass.

An efficient method for melting glass can include using submerged combustion melting ("SCM"). SCM is based on enhancing heat transfer by mixing combustible fuels and oxidants with raw glass material and firing the fuels and oxidants directly into and under the surface of the glass material to be melted. The contact between the raw glass material and the combusting fuels and oxidants generates a bubbling bath of molten glass along with high rates of mass and heat transfer.

The melting apparatus and method described herein may be used in different types of glass melting including SCM. In SCM, an air-fuel or oxygen-fuel mixture is injected directly into a pool of raw materials within a melting chamber or melter. Burners can be arranged at the bottom and sides of the chamber beneath the top surface of the material and can stimulate rapid melting of the raw materials by combusting the fuel within the pool of raw materials. Combustion gases bubble through the raw materials and create turbulent mixing of the raw materials at a high-heat transfer rate, melt the raw materials into the molten glass, and mix the molten glass to create a homogeneous glass. Once the molten glass achieves a uniform composition, it can then be removed or drained from the chamber to be further processed and/or used to form desired products.

Utilizing SCM yields intense combustion and direct-contact heat transfer as the combustion gases bubble through the raw materials and the molten glass and results in a high rate of heat transfer further resulting in high thermal efficiency. Due to these advantages, SCM uses less energy to melt the raw materials and can utilize a smaller melter and/or furnace compared to other melting methods. Additionally, the molten glass spends less time in the melter and is rapidly mixed.

SCM systems can be simple and inexpensive because the SCM chamber is tolerant of a wide range of raw material and cullet size, can accept multiple types of raw glass batch material feeds, and does not require mixing of the feed material prior to addition to the chamber. However, a glass batch that is fed to the melter may exit in a relatively short time for some submerged combustion melters used in the glass industry, which may risk an unmolten or partially unmolten batch and limit improvement of throughput.

Consequently, the present disclosure is directed to a submerged combustion melter and system that employs at least one baffle (or skimmer) to form a series of melting sub-chambers configured to guide and control the flow of raw batch materials and molten glass within the submerged combustion melter. Additionally, the series of melting sub-chambers in the disclosed submerged combustion melter share one exhaust system.

FIGS. 1-6B illustrate a submerged combustion melter system 100 and a submerged combustion melter 102 in accordance with an illustrative embodiment of the present disclosure. The submerged combustion melter system 100 and the submerged combustion melter 102 can include at least one bottom wall 104, at least one side wall 106, and a crown 108 to establish a melting chamber 112. Additionally, the submerged combustion melter system 100 and the submerged combustion melter 102 can include at least one baffle 110 configured to subdivide the melting chamber 112 and at least partially define two or more melting sub-chambers 112a, 112b, 112c, 112d, 112e, 112f, 112g disposed within the overall melting chamber 112 in the submerged combustion melter system 100 and the submerged combustion melter 102. It will be appreciated that the submerged combustion melter 102 can include a variety of configurations, for example, more or less baffles and/or more or less melting sub-chambers than shown in FIGS. 1-6B.

As illustrated in FIGS. 1-6B, a submerged combustion melter 102 can include a bottom wall 104. The bottom wall 104 can include a panel that may be cooled (e.g., fluid-cooled) using a variety of materials, such as water, steam, or other appropriate fluids that can serve as a heat carrier, or may be non-fluid-cooled. The bottom wall 104 can include materials that can withstand thermal, chemical, and physical erosion and corrosion. Additionally, the bottom wall 104 can include at least one opening configured to receive a submerged combustion burner 124. As the submerged combustion melter 102 size is increased, the number of burners 124 and openings in the bottom wall 104 can be increased.

In implementations, at least one side wall 106 can be disposed on and coupled to the bottom wall 104. Similar to the bottom wall 104, each side wall 106 can include material that can withstand thermal, chemical, and physical erosion and corrosion, and each side wall 106 may be fluid-cooled, for example using water, steam, or other appropriate fluids configured to serve as a heat carrier, or may be non-fluid-cooled. In implementations, each side wall 106 can generally extend perpendicularly from the bottom wall 104. In one specific embodiment, a submerged combustion melter 102 can include four side walls 106 that are coupled to the bottom wall 104 and at least partially define a chamber within the submerged combustion melter 102. It is contemplated that the submerged combustion melter 102 can include a variety of other configurations of side walls 106 (e.g., three side walls 106 or more) disposed on the bottom wall 104.

As depicted in FIGS. 1-6B, a crown 108 can be disposed on and coupled to the side walls 106, where the crown 108, the side walls 106, and the bottom wall 104 define the submerged combustion melter 102. In a specific embodiment, the crown 108, the side walls 106, and the bottom wall 104 can be coupled and configured in the form of a box, where the side walls 106 can be coupled perpendicular to both the bottom wall 104 and the crown 108. In other embodiments, the submerged combustion melter 102 may include multiple side walls 106 located between and connecting the crown 108 and the bottom wall 104. In an example of this embodiment, a first side wall 106a can be coupled to the crown 108 perpendicularly, and a second side wall 106b can be coupled to both the first side wall 106a and the bottom wall 104 at an angle (e.g., 45° each connection), where the crown 108 and the bottom wall 104 can be parallel. It is contemplated that the side walls 106 of the submerged combustion melter 102 may include a variety of other configurations.

The crown 108 can be formed of materials that are capable of withstanding thermal, chemical, and physical erosion and corrosion. In implementations, the crown 108 may be fluid-cooled utilizing water, steam, or other suitable heat transfer fluids, or may be non-fluid-cooled. Additionally, an exhaust port 118 can be disposed on and/or extend through the crown 108 for exhausting combustion gases from the submerged combustion melter 102 and each melting sub-chamber 112a, 112b, 112c, 112d, 112e, 112f, 112g. The exhaust port 118 can serve as a single exhaust for each respective melting sub-chamber 112a, 112b, 112c, 112d, 112e, 112f, 112g disclosed herein and avoids the requirement of multiple exhausting duct systems.

In implementations, the distance from a first side wall (e.g., a side wall proximate to an inlet) to a second side wall (e.g., a side wall proximate to an outlet and opposite from the first side wall) can define a longitudinal axis. The distance from a third side wall to a fourth side wall (e.g., where the third side wall and the fourth side wall are opposite from each other and each abut the first side wall and the second side wall) can define a laterally transverse axis, where the laterally transverse axis is perpendicular to the longitudinal axis. The distance from the bottom wall to the crown can define a vertically transverse axis.

In embodiments, at least one inlet 114 can be disposed on and extend through the crown 108 and/or a side wall 106. In the embodiments shown in FIGS. 1-6B, the inlet 114 extends through the crown 108. The inlet(s) 114 can be configured to introduce material to be melted (e.g., a glass batch) into the submerged combustion melter 102 from, for example, a batch charger 128. In glass manufacturing, a glass batch can include raw or starting materials used to form a uniform homogenous composition. The raw materials can include a variety of different chemical compositions (e.g., various oxides to form soda-lime-silica glass) and may be mixed with cullet or recycled glass to constitute glassmaking materials. The glass batch can be delivered or passed into a glass furnace or melter by way of a glass or batch charger 128. The batch charger 128 can be coupled to the submerged combustion melter 102 at any desired location (e.g., the crown 108, a side wall 106) and can have a feeding port (e.g., inlet 114) to pass glass batch into the submerged combustion melter 102 to be melted. In a specific embodiment, a batch charger 128 can be configured to deliver a glass batch through an inlet 114 that extends through the crown 108 and into the submerged combustion melter 102.

At least one baffle 110 (or skimmer) can be disposed in the submerged combustion melter 102. Each baffle 110 may be fluid-cooled using steam, water, or other fluids suitable for heat transfer, or may be non-fluid-cooled, and can be formed of materials that are capable of withstanding thermal, chemical, and physical erosion and corrosion. Some example materials suitable may include noble metals, for example platinum and/or rhodium. It will be appreciated that the baffle(s) 110 may comprise other suitable metals.

Figure 1B:
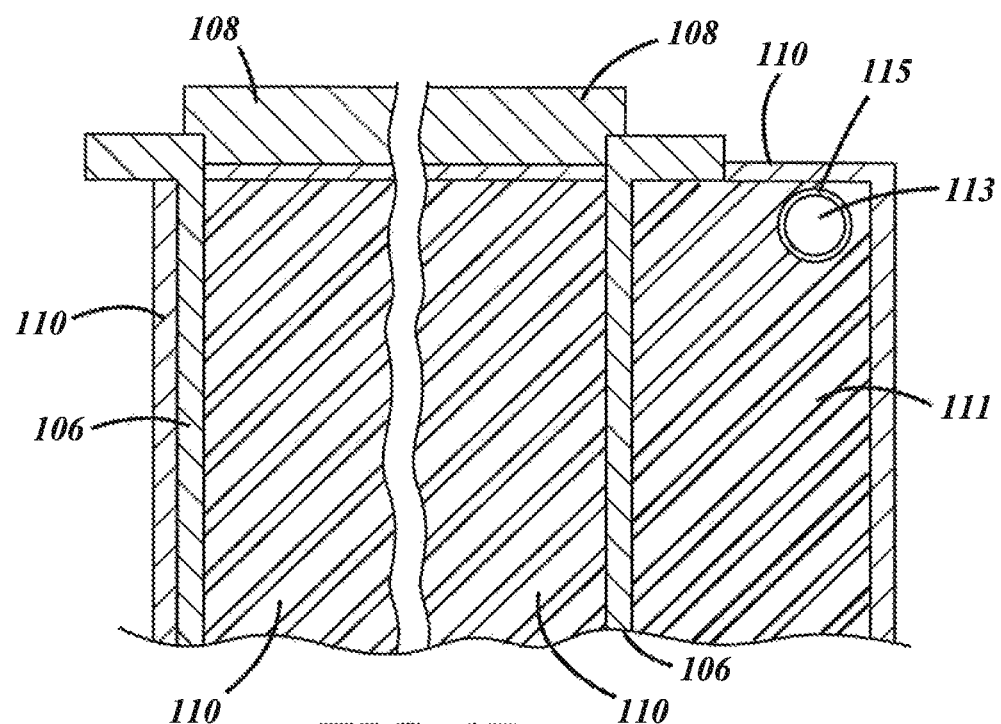
FIG. 1B is a fragmentary cross-sectional view illustrating the baffle in FIG. 1A, where the baffle is shown within a portion of the submerged combustion melter, in accordance with an illustrative embodiment of the present disclosure.
Figure 1C:
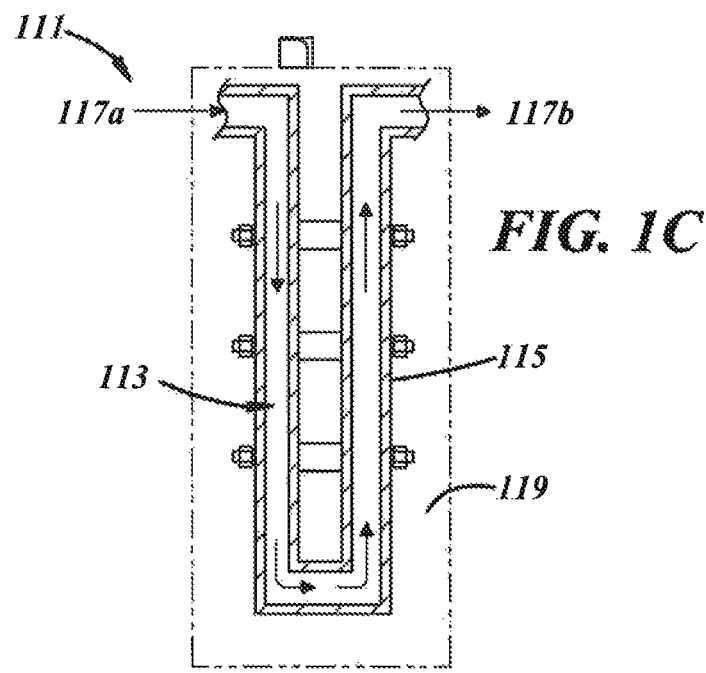
FIG. 1C is an elevational view showing an end cap of the baffle illustrated in FIG. 1B, in accordance with an illustrative embodiment of the present disclosure.
Figure 1D:
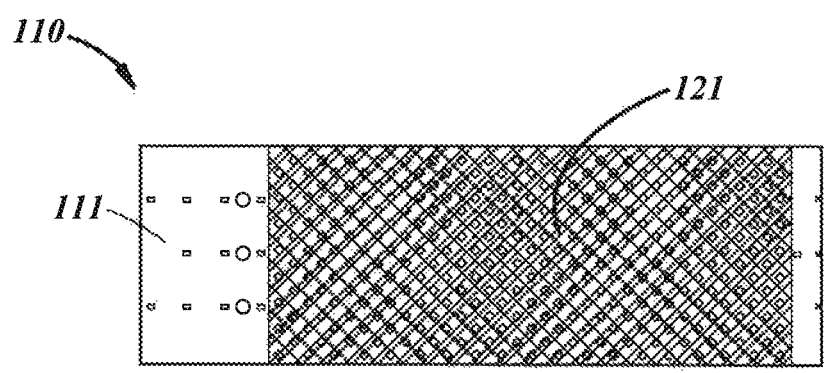
FIG. 1D is an elevational view showing the baffle illustrated in FIG. 1B, in accordance with an illustrative embodiment of the present disclosure.
Figure 1E:
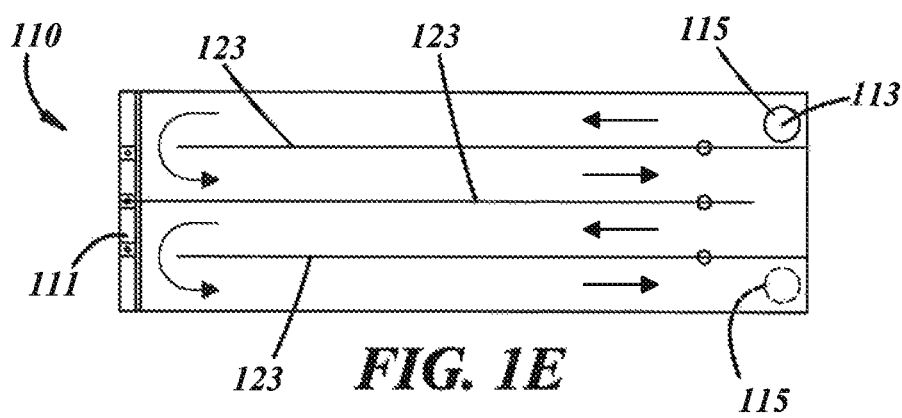
FIG. 1E is an elevational view showing the baffle illustrated in FIG. 1B, in accordance with an illustrative embodiment of the present disclosure.
Figure 1F:
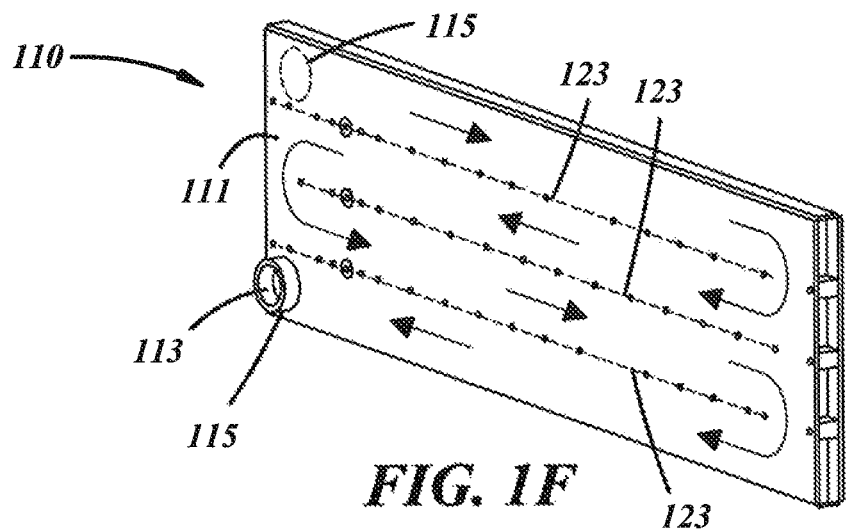
FIG. 1F is an isometric view showing the baffle illustrated in FIG. 1B, in accordance with an illustrative embodiment of the present disclosure.

FIG. 1B illustrates an embodiment showing a cross-section of the baffle 110 disposed within the submerged combustion melter 102. In this embodiment, the baffle 110 extends between and/or through two side walls 106 and proximate to the crown 108; however, it will be appreciated that the baffle 110 may configured in a variety of ways (e.g., coupled to and/or abutting the bottom wall 104, disposed equidistant from the bottom wall 104 and the crown 108, and the like). The baffle 110 is shown having an end cap 111, further illustrated in FIG. 1C, which is disposed on the outside of one side wall 106 and the submerged combustion melter 102. The end cap 111 can be configured to fasten the baffle 110 to the side wall 106. Additionally, the end cap 111 can be configured to provide a heat transfer fluid reservoir, and may include a fluid passage 113 and/or a tube 115 that can include a fluid inlet 117a and/or outlet 117b or to carry the heat transfer fluid. When fluid-cooled, the at least one baffle 110 may be configured to receive cooling fluid from at least one fluid-cooled side wall 106 and/or from the end cap 111. As shown in FIG. 1C, the end cap 111 may include a plate 119 (e.g., end wall of the baffle 110) and/or the tube 115 configured for carrying the heat transfer fluid. Additionally, the baffle 110 may include an end cap 111 for a non-fluid-cooled baffle 110 or for a fluid-cooled baffle 110. In the embodiment shown in FIG. 1D, the baffle 110 is non-fluid-cooled and includes a refractory material 121 (e.g., silicon dioxide (SiO2), aluminum oxide ($Al_2O_3$), and the like). In the embodiments shown in FIGS. 1E and 1F, the baffle 11 is fluid-cooled. In this embodiment, heat transfer fluid can be contained and/or enter the end cap 111 through a fluid passage 113 and travel along a path (e.g., a serpentine path) created by at least one wall 123 disposed in the baffle 110. The heat transfer fluid may then return to and remain within the end cap 111 and/or may exit the end cap 111 through a fluid passage 113. It will be appreciated that the fluid-cooled and/or the non-fluid-cooled baffle(s) 110 may include other configurations and arrangements.

In implementations, a series of baffles 110 can be coupled to respective side walls 106 and configured so that molten glass (e.g., product flow) flows through the submerged combustion melter 102 and around each baffle 110 in an undulated flow path 122. Each baffle 110 may or may not be disconnected from the crown 108. In some instances, the baffle(s) 110 can be permanently coupled to the side wall(s) 106. In some instances, the baffle 110 can be mechanically/manually movable, adjustable, and/or repositionable. For example, the angle of the baffle 110 may be adjustable relative to the flow of the molten glass, the side wall 106, and/or the bottom wall 104. It will be appreciated that each baffle 110 may be movable and/or repositionable using other means, such as with an actuator. In embodiments, the submerged combustion melter 102 can include a set of baffles 110 that are staggered from each other. The baffles 110 may be staggered from side-to-side and/or from top to bottom, where the crown 108 can be disposed at the top, and the bottom wall 104 can be disposed at the bottom.

In the exemplary embodiment illustrated in FIG. 1A, the submerged combustion melter 102 can include a series of baffles 110 where the first baffle 110 is coupled to at least one side wall 106 proximate to the inlet 114 and directs molten glass to flow between the first baffle 110 and the bottom wall 104. A second baffle 110 can be coupled to a side wall 106 and may be coupled to and/or abut the bottom wall 104. The second baffle 410 can be configured to prohibit flow of the molten glass between the second baffle 110 and the bottom wall 104, but instead direct molten glass to flow over the second baffle 110 (e.g., between the second baffle 110 and the space proximate to the crown 108). In each case where a baffle is configured to prohibit flow of the molten glass between the baffle and the bottom wall 104, the baffle may or may not be coupled to the bottom wall 104. Additional baffles 110 (e.g., a third baffle, a fourth baffle, a fifth baffle, and so on) can be similarly staggered such that molten glass flows in a vertically undulated pattern (e.g., from top to bottom to top and so forth along the vertically transverse axis) between the inlet 114 and the outlet 116 and flows generally along the longitudinal axis as shown by the exemplary undulated flow path 122 indicated in FIGS. 1 and 2. For instance, a third baffle 110 can be coupled to a side wall 106 and can direct molten glass to flow between the third baffle 110 and the bottom wall 104, where the second baffle 110 is disposed between the first baffle 110 and the third baffle 110. In the example shown in FIG. 1A, the outlet 116 is disposed below the molten glass surface 120, and in the example shown in FIG. 2, the outlet 116 is disposed at the molten glass surface 120, although it is contemplated that the outlet 116 may be disposed in other locations in the submerged combustion melter 102.

The submerged combustion melter 102 can include a melting chamber 112, which can be divided into melting sub-chambers 112a, 112b, 112c, 112d, 112e, 112f, 112g. Each melting sub-chamber 112a, 112b, 112c, 112d, 112e, 112f, 112g can be defined by the bottom wall 104, at least one side wall 106, and at least one baffle 110, where one side of the melting sub-chambers 112a, 112b, 112c, 112d, 112e, 112f, 112g (e.g., proximate to the crown 108) can be open to a single exhaust chamber 134 and exhaust port 118, which can be configured to exhaust combustion gases (e.g., flue gas 126). Each respective melting sub-chamber 112a, 112b, 112c, 112d, 112e, 112f, 112g in the submerged combustion melter 102 can be open and in fluid communication with the same exhaust chamber 134 and exhaust port 118. In a specific example, a first melting sub-chamber 112a can be defined by a first baffle 110, three side walls 106, and the bottom wall 104. In this same example, a second melting sub-chamber 112b can be defined by the first baffle 110, the second baffle 110, two side walls 106, and the bottom wall 104. Additional melting sub-chambers can be likewise defined. In this way, the molten glass can flow through the series of melting sub-chambers along an undulating flow path 122 to the outlet 116 while the flue gas 126 from each melting sub-chamber 112a, 112b, 1/2c, 112d, 112e, 112f, 112g exits the submerged combustion melter 102 through a single exhaust chamber 134 and exhaust port 118. In implementations, the melting sub-chambers 112a, 112b, 112c, 112d, 112e, 112f, 112g may operate with different temperatures in each melting sub-chamber. The different temperatures may be controlled by using different burners or different numbers of burners for each melting sub-chamber. In one example, the same type and number of burners can be used, but with the burners operating at different gas and oxidant flow rates. Some example melting sub-chamber temperatures may include 1100-1200 degrees Celsius (C.), 1200-1300 degrees Celsius (C.), 1300-1400 degrees Celsius (C.), and 1400-1500 degrees Celsius (C.).

As illustrated in FIGS. 1 through 6B, the submerged combustion melter 102 can include at least one outlet 116 configured for removing and/or draining molten glass from the submerged combustion melter 102, for example, to a finer. In implementations, the outlet 116(s) can extend through the bottom wall 104 and/or a side wall 106. For example, the outlet 116 can be disposed on and extend through a portion of a side wall 106 that is below a molten glass level 120. In another example, the outlet 116 can be disposed on and extend through a portion of a side wall 106 that is at the same level as or proximate to a molten glass level 120 (e.g., "melt level"). In some embodiments, the submerged combustion melter 102 can include more than one outlet 116. For example, the submerged combustion melter 102 can include an outlet (e.g., a first outlet 130) that is at the same level as a molten glass level 120 and an outlet (e.g., a second outlet 116) that is below the molten glass level 120. In implementations, the outlet 116 can be disposed on a side of the submerged combustion melter 102 that is distal from a side of the submerged combustion melter 102 having the inlet 114.

As illustrated in FIGS. 1 through 4, a submerged combustion melter system 100 can include a submerged combustion melter 102 and at least one burner 124 coupled to and/or proximate to the submerged combustion melter 102. A burner 124 can be configured to fire natural gas or other fuel and oxidant (e.g., air, oxygen-enriched air, oxygen) into a bath of material (e.g., glass batch) undergoing melting within the submerged combustion melter 102. In implementations, a burner 124 can be disposed proximate to the bottom wall 104 and/or at least one side wall 106. For example, a submerged combustion melter system 100 can include a series of burners 124 proximate to the bottom wall 104 and corresponding with a series of melting sub-chambers 112a, 112b, 112c, 112d within the submerged combustion melter 102. It is contemplated that the submerged combustion melter system 100 can include a number of burners 124 (e.g., one burner, two burners, and so forth) in a variety of configurations. The burner(s) 124 can be configured to heat the submerged combustion melter 102 to temperatures suitably high to melt the glass batch (e.g., 1200 to 1600 degrees Celsius (C.)).

Figure 2:
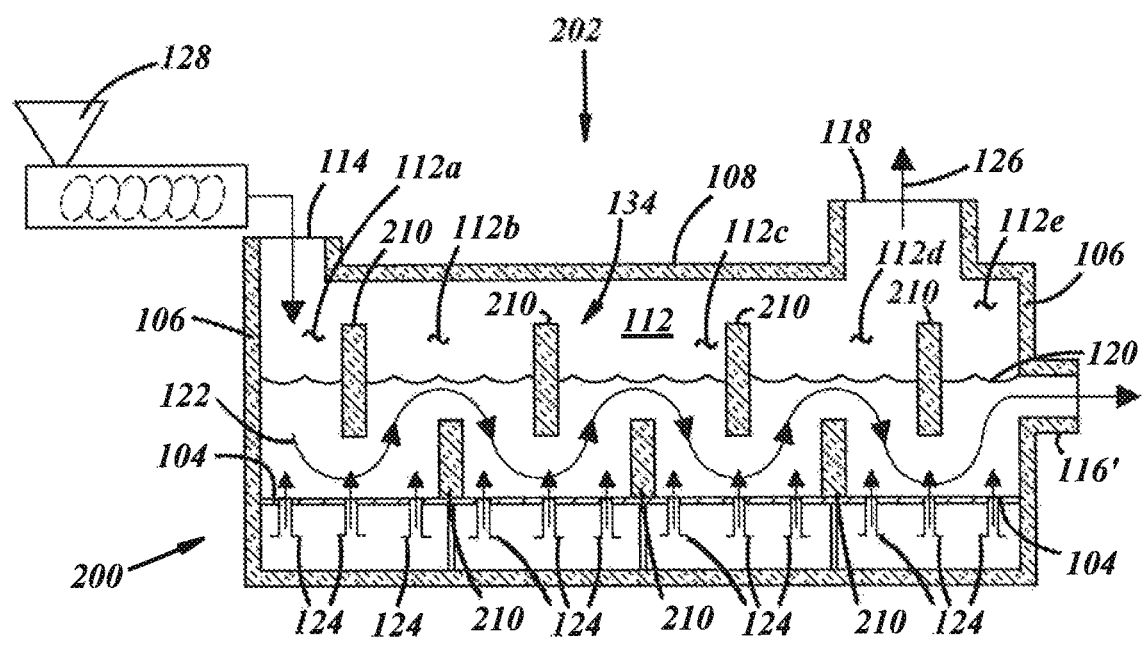
FIG. 2 is a schematic cross-sectional view illustrating a submerged combustion melter having at least one baffle that creates a series of melting sub-chambers with a single exhaust system, a vertically undulating flow path, and a melt-level outlet, in accordance with an illustrative embodiment of the present disclosure.

FIG. 2 shows an illustrative embodiment of a submerged combustion melter system 200 and submerged combustion melter 202 including a series of baffles 210. This embodiment is similar in many respects to the embodiment of FIG. 1A and like numerals among the embodiments generally designate like or corresponding elements throughout the several views of the drawing figures. Accordingly, the descriptions of the embodiments are incorporated into one another, and description of subject matter common to the embodiments generally may not be repeated here.

In the exemplary embodiments illustrated in FIG. 2, the submerged combustion melter 202 can include a series of baffles 210 coupled to at least one side wall 106 and may extend partially above a melt level of the molten glass, where each baffle can be respectively staggered. In implementations, a melt level that is continuously varying can be measured and a moving average can be determined. In other implementations, the melt level can be determined by placing the submerged combustion melter 202 on load cells, and the weight of the glass can be measured and converted to a melt level. In an example, a first baffle 210 disposed proximate to the inlet 114 can be coupled to a first side wall 106 and a second side wall 106 opposite the first side wall 106 (see 410 FIGS. 5A and 5B), where the first baffle 210 directs molten glass to flow only between the first baffle 210 and the bottom wall 104. A second baffle 210 can be disposed between the first baffle 210 and the outlet 116 and coupled to the first side wall 106, the second side wall 106, and the bottom wall 104, where the second baffle 210 directs molten glass to flow over the top of the second baffle 210 (e.g., between the second baffle 210 and the crown 108). Additional baffles 210 (e.g., a third baffle, a fourth baffle, a fifth baffle, and so on) can be similarly staggered such that molten glass flows in a vertically undulated pattern (e.g., from bottom to top and so forth along the vertically transverse axis) between the inlet 114 and the outlet 116 and flows generally along the longitudinal axis as shown by the undulated flow path 122 indicated in FIG. 2. The second baffle 210 can be disposed between the first baffle 210 and a third baffle 210, where the third baffle 210 directs molten glass to flow only between the third baffle 210 and the bottom wall 104. It is contemplated that the molten glass can flow in a combination of patterns and/or flow paths. For example, multiple baffles 210 can be positioned so that the molten glass can flow simultaneously along a vertically transverse axis and generally along a longitudinal axis from the inlet 114 to the outlet 116. In the example illustrated in FIG. 2, the submerged combustion melter 202 can include an outlet 116 disposed at the molten glass surface 120 ("melt level").

Figure 3:
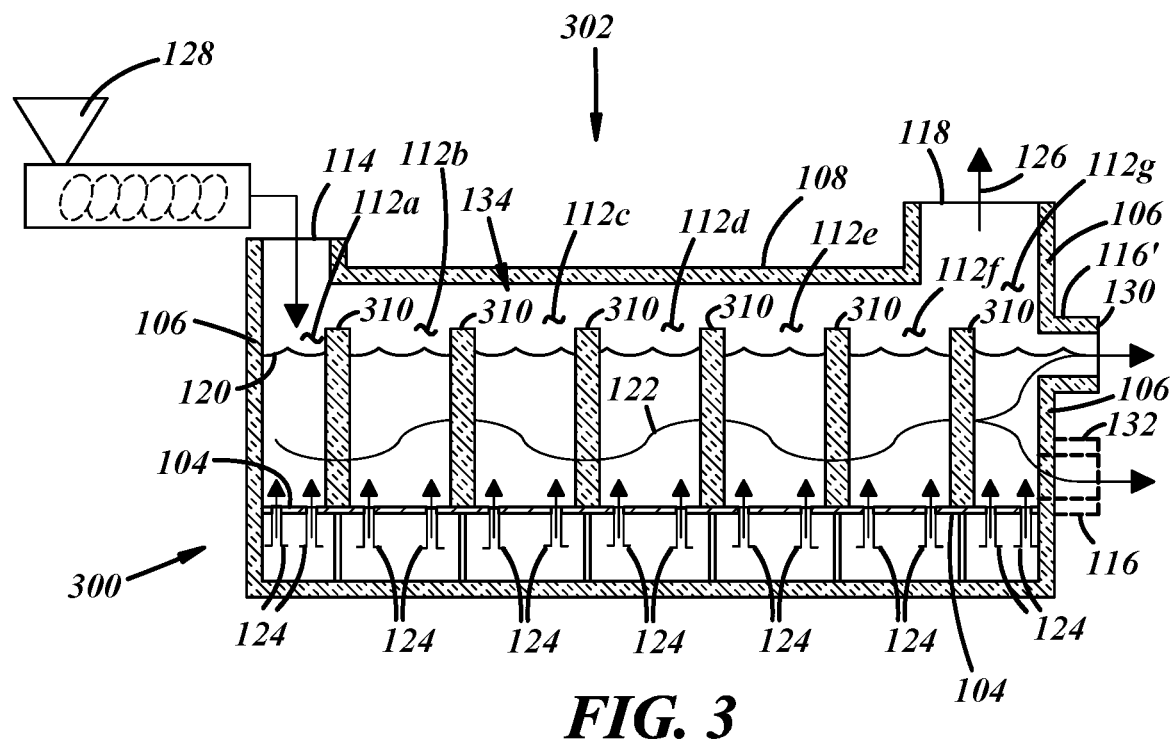
FIG. 3 is a schematic cross-sectional view illustrating a submerged combustion melter having at least one baffle that creates a series of melting sub-chambers with a single exhaust system, a horizontally undulating flow path, and a melt-level outlet and/or an outlet below melt-level, in accordance with an illustrative embodiment of the present disclosure.
Figure 4:
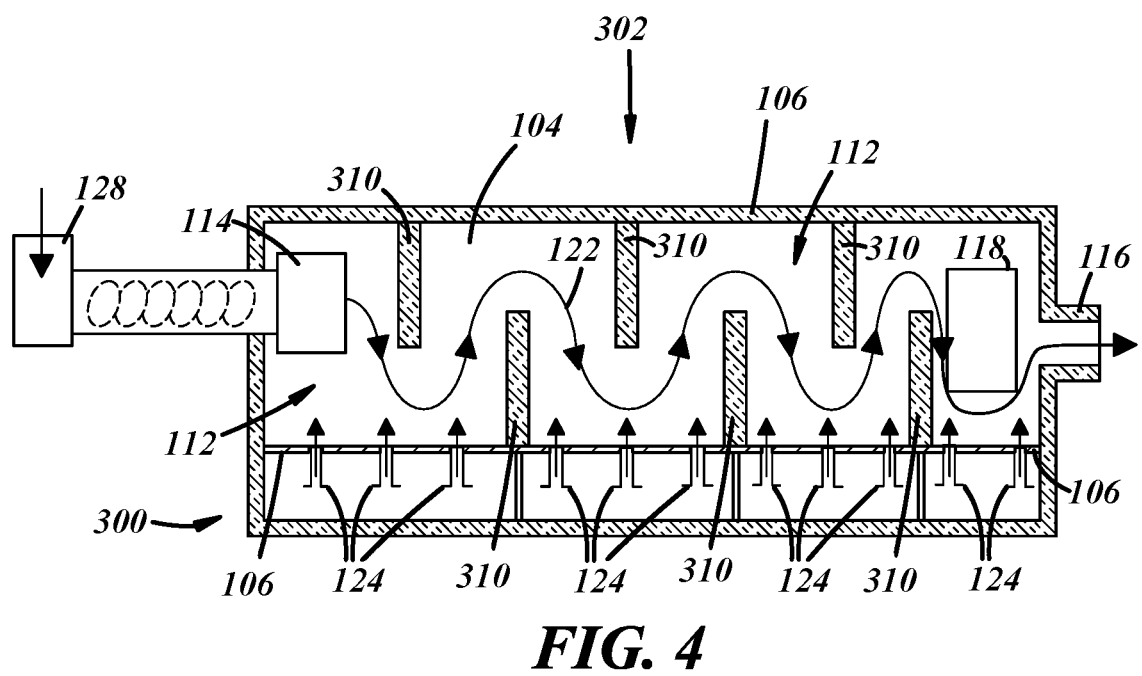
FIG. 4 is a schematic top plan view illustrating the submerged combustion melter of FIG. 3.

FIGS. 3 and 4 show another illustrative embodiment of a submerged combustion melter system 300 and a submerged combustion melter 302 including a series of baffles 310. This embodiment is similar in many respects to the embodiments of FIGS. 1 and 2 and like numerals among the embodiments generally designate like or corresponding elements throughout the several views of the drawing figures. Accordingly, the descriptions of the embodiments are incorporated into one another, and description of subject matter common to the embodiments generally may not be repeated here.

In the exemplary embodiments illustrated in FIGS. 3 and 4, the submerged combustion melter system 300 and the submerged combustion melter 302 can include a series of baffles 310 coupled to a side wall 106 and may extend partially above a molten glass surface 120 of the molten glass, where each baffle 310 can be respectively staggered. For example, a first baffle 310 disposed proximate to the inlet 114 can be coupled to a first side wall 106, where the first baffle 310 directs molten glass to flow only between the first baffle 310 and a second side wall 106 that is opposite the first side wall 106. A second baffle 310 can be disposed between the first baffle 310 and the outlet 116 and coupled to the second side wall 106, where the second baffle 310 directs molten glass to flow only between the second baffle 310 and the first side wall 106. Additional baffles 310 (e.g., a third baffle, a fourth baffle, a fifth baffle, and so on) can be similarly staggered such that molten glass flows in a laterally undulated pattern (e.g., from side to side and so forth along the laterally transverse axis, horizontally undulated) and flows between the inlet 114 and the outlet 116 generally along the longitudinal axis as shown by the undulated flow path 122 indicated in FIGS. 3 and 4. The second baffle 310 can be disposed between the first baffle 310 and a third baffle 310, where the third baffle 310 directs molten glass to flow only between the third baffle 310 and the second side wall 106. It is contemplated that the molten glass can flow in a combination of patterns and/or flow paths. For example, multiple baffles 310 can be positioned so that the molten glass can flow simultaneously along a laterally transverse axis and a vertically transverse axis and generally along a longitudinal axis from the inlet 114 to the outlet 116. In the example illustrated in FIG. 3, the submerged combustion melter 302 can include multiple outlets 116 (e.g., an outlet 130 at the molten glass surface 120 and an outlet 116 below the molten glass surface 120).

Figure 5A:
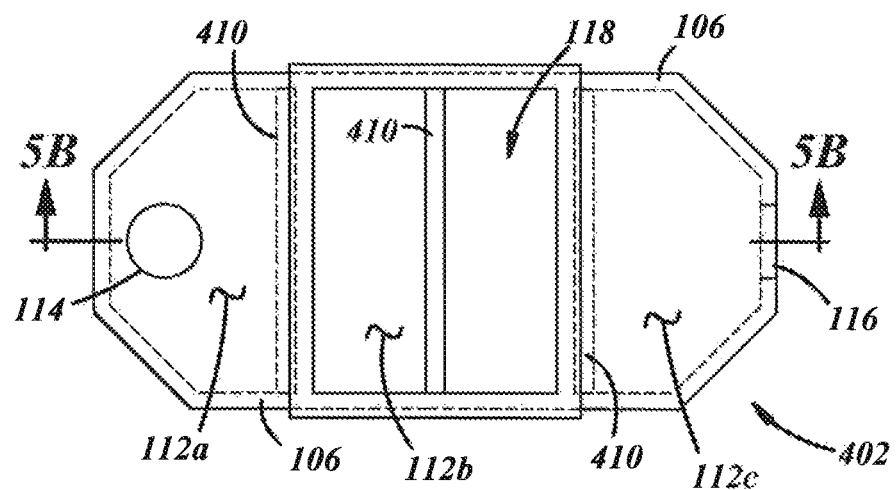
FIG. 5A is a schematic top plan view illustrating a submerged combustion melter having at least one baffle that creates a series of melting sub-chambers with a single exhaust system, a vertically undulating flow path, and an outlet below melt-level, in accordance with an illustrative embodiment of the present disclosure.
Figure 5B:
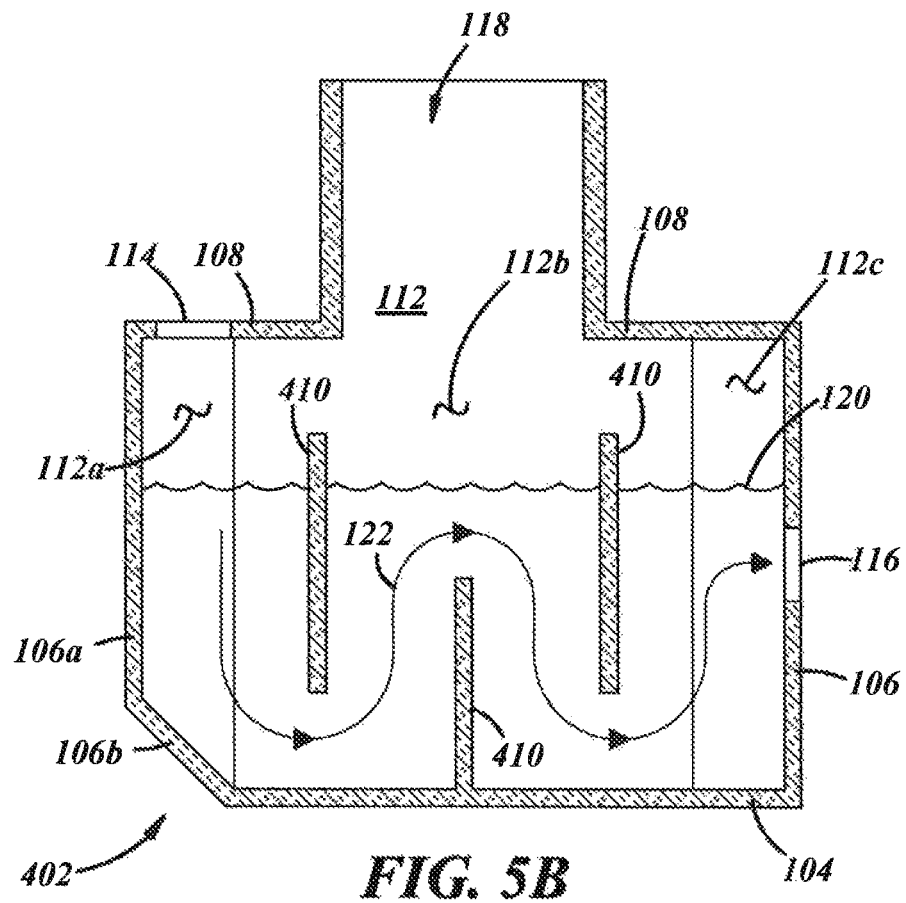
FIG. 5B is a schematic cross-sectional view illustrating the submerged combustion melter of FIG. 5A and taken along line 5B of FIG. 5A.

FIGS. 5A and 5B show another illustrative embodiment of a submerged combustion melter 402 including a series of baffles 410. This embodiment is similar in many respects to the embodiments of FIGS. 1 through 4 and like numerals among the embodiments generally designate like or corresponding elements throughout the several views of the drawing figures. Accordingly, the descriptions of the embodiments are incorporated into one another, and description of subject matter common to the embodiments generally may not be repeated here.

In the embodiment illustrated in FIGS. 5A and 5B, the submerged combustion melter 402 includes a series of baffles 410 that are disposed along a longitudinal axis and staggered along a vertically transverse axis. The series of baffles 410 can direct the flow of molten glass along an undulated flow path 122, where the molten glass flows between the top (e.g., crown 108) and the bottom (e.g., bottom wall 104) of the submerged combustion melter 402 along a vertically transverse axis and generally flows along a longitudinal axis from the inlet 114 to the outlet 116. For example, the molten glass can flow from a first melting chamber 112a between a first baffle 410 and the bottom wall 104 to a second melting chamber 112b. From the second melting chamber 112b, the molten glass can flow over a second baffle 410 (e.g., between the second baffle 410 and the crown 108) into a third melting chamber 112c and so forth until the molten glass reaches outlet 116. The series of baffles 410 can define a series of melting sub-chambers 112a, 112b, 112c that share the exhaust port 118. In this embodiment, the exhaust port 118 can be disposed proximate to the center (e.g., about equidistant from the inlet 114 and from the outlet 116) of the crown 108.

Figure 6A:
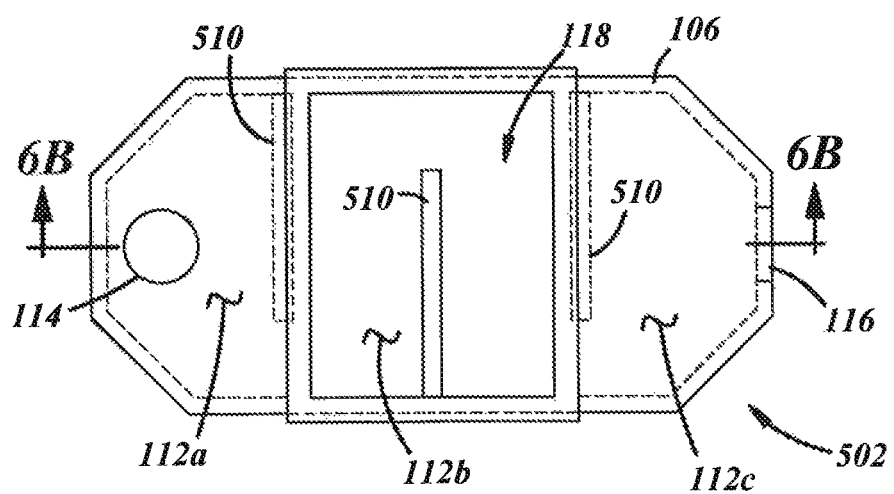
FIG. 6A is a schematic top plan view illustrating a submerged combustion melter having at least one baffle that creates a series of melting sub-chambers with a single exhaust system, a horizontally undulating flow path, and an outlet below melt-level, in accordance with an illustrative embodiment of the present disclosure.
Figure 6B:
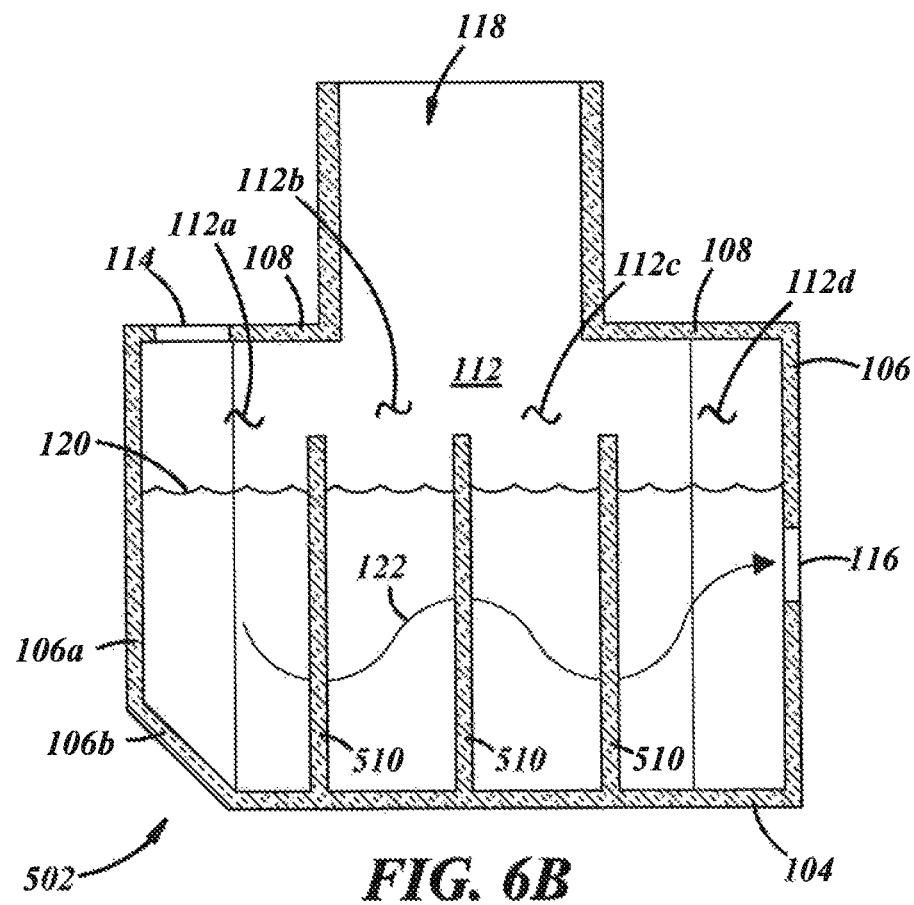
FIG. 6B is a schematic cross-sectional view illustrating the submerged combustion melter of FIG. 6A and taken along line 6B of FIG. 6A.

FIGS. 6A and 6B show another illustrative embodiment of a submerged combustion melter 502 including a series of baffles 510. This embodiment is similar in many respects to the embodiments of FIGS. 1 through 5B and like numerals among the embodiments generally designate like or corresponding elements throughout the several views of the drawing figures. Accordingly, the descriptions of the embodiments are incorporated into one another, and description of subject matter common to the embodiments generally may not be repeated here.

In the embodiment illustrated in FIGS. 6A and 6B, the submerged combustion melter 502 includes the series of baffles 510 disposed along a longitudinal axis and staggered along a vertically transverse axis. The series of baffles 510 can direct the flow of molten glass along an undulated flow path 122, where the molten glass flows between the sides of the submerged combustion melter 502 along a laterally transverse axis and generally flows along a longitudinal axis from the inlet 114 to the outlet 116. For example, the molten glass can flow from a first melting chamber 112a between a first baffle 510 and a first side wall 106 to a second melting chamber 112b. From the second melting chamber 112b, the molten glass can flow between a second baffle 410 and a second side wall 106 into a third melting chamber 112c and so forth until the molten glass reaches outlet 116. The series of baffles 510 define a series of melting sub-chambers 112a, 112b, 112c, 112d that are divided from melting chamber 112, where the melting sub-chambers 112a, 112b, 112c, 112d share the exhaust port 118. In this embodiment, the exhaust port 118 is disposed proximate to the center (e.g., about equidistant from the inlet 114 and from the outlet 116) of the crown 108.

There thus has been disclosed a submerged combustion melter systems and submerged combustion melters for guiding and controlling molten glass flow while providing a single exhausting system that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A submerged combustion melter, comprising:
a bottom wall;
a plurality of side walls including a first side wall, a second side wall, a third side wall, and a fourth side wall extending upwardly from the bottom wall;
a longitudinal axis extending from the first side wall to the second side wall;
a laterally transverse axis extending from the third side wall to the fourth side wall, the laterally transverse axis perpendicular to the longitudinal axis;
a crown extending inwardly with respect to the plurality of side walls and over the bottom wall to establish a melting chamber;
an exhaust port configured to exhaust gas from the melting chamber;
a plurality of baffles including a first baffle and a second baffle, the first baffle coupled to at least one side wall of the plurality of side walls and the second baffle coupled to at least one side wall of the plurality of side walls, both the first and second baffles disconnected from the crown, wherein the first baffle and the second baffle are in a staggered configuration, the first baffle extending inwardly from at least one side wall of the plurality of side walls to which it is coupled and the second baffle extending inwardly from at least one side wall of the plurality of side walls to which it is coupled to divide the melting chamber into at least three melting sub-chambers that share the exhaust port, wherein at least one baffle of the plurality of baffles is a fluid-cooled baffle configured to receive a cooling fluid from the at least one side wall of the plurality of side walls to which it is coupled;

an inlet configured for introducing a glass batch to the submerged combustion melter;

at least one outlet configured to remove molten glass from the at least three melting sub-chambers; and wherein the at least three melting sub-chambers are configured to direct product flow in an undulating flow path between the inlet and the at least one outlet.

2. The submerged combustion melter of claim 1, wherein at least one of the bottom wall, at least one side wall of the plurality of sidewalls, or the crown is fluid-cooled.

3. The submerged combustion melter of claim 1, wherein at least one of the bottom wall, at least one side wall of the plurality of sidewalls, or the crown is non-fluid-cooled.

4. The submerged combustion melter of claim 1, wherein at least one baffle of the plurality of baffles is a non-fluid-cooled baffle.

5. The submerged combustion melter of claim 4, wherein the non-fluid-cooled baffle includes a refractory material.

6. The submerged combustion melter of claim 5, wherein the refractory material includes at least one of silicon dioxide or aluminum oxide.

7. The submerged combustion melter of claim 1, wherein the cooling fluid includes at least one of water, steam, or air.

8. The submerged combustion melter of claim 1, wherein combustion gases from all the melting sub-chambers collect in one exhaust chamber and exhaust from the exhaust port.

9. The submerged combustion melter of claim 1, wherein the plurality of baffles further comprises a third baffle coupled to at least one side wall of the plurality of side walls, wherein the first baffle and the third baffle are staggered from the second baffle.

10. The submerged combustion melter of claim 1, wherein molten glass flows in a vertically undulated pattern between the inlet and the outlet.

11. The submerged combustion melter of claim 1, wherein at least one baffle of the plurality of baffles extends partially above a molten glass surface and molten glass flows in a laterally undulated pattern between the inlet and the at least one outlet.

12. The submerged combustion melter of claim 11, wherein the first baffle is coupled to the third side wall and the second baffle is coupled to the fourth side wall.

13. The submerged combustion melter of claim 1, wherein the plurality of baffles is disconnected from the crown.

14. The submerged combustion melter of claim 1, wherein at least one baffle of the plurality of baffles is removable from at least one side wall of the plurality of the side walls.

15. The submerged combustion melter of claim 1, wherein an angle of at least one baffle of the plurality of baffles is adjustable.

16. The submerged combustion melter of claim 1, wherein at least one baffle of the plurality of baffles is coupled to the bottom wall and at least one side wall of the plurality of side walls.

17. The submerged combustion melter of claim 1, wherein the inlet is coupled to and extends through at least one side wall of the plurality of side walls or the crown, wherein the inlet is disposed distal from the at least one outlet.

18. The submerged combustion melter of claim 17, wherein the at least one outlet is coupled to and extends through at least one side wall of the plurality of side walls, wherein the at least one outlet is disposed at least one of at a surface of the molten glass or below the surface of the molten glass, and wherein the at least one outlet is disposed distal from the inlet.

19. The submerged combustion melter of claim 1, wherein the undulating flow path is generally along the longitudinal axis that extends from the first side wall proximate to the inlet to the second side wall proximate to the at least one outlet and is along a vertically transverse axis that extends from the bottom wall to the crown.

20. The submerged combustion melter of claim 1, wherein the undulating flow path is generally along the longitudinal axis that extends from the first side wall proximate to the inlet to the second side wall proximate to the outlet and is along the laterally transverse axis that extends from the third side wall to the fourth side wall.

21. The submerged combustion melter of claim 1, wherein the first baffle and the second baffle are staggered along a vertically transverse axis.

22. The submerged combustion melter of claim 1, wherein both the first baffle and the second baffle are each coupled to two of the side walls of the plurality of side walls, the two of the side walls being along the lateral transverse axis.

23. The submerged combustion melter of claim 1, wherein the first baffle is coupled to the third side wall and the second baffle is coupled to the fourth side wall.

24. The submerged combustion melter of claim 1, wherein the at least one outlet is below the molten glass surface.

25. A submerged combustion melter system, comprising:
a bottom wall;
a plurality of side walls including a first side wall, a second side wall, a third side wall, and a fourth side wall extending upwardly from the bottom wall;
a longitudinal axis extending from the first side wall to the second side wall;
a laterally transverse axis extending from the third side wall to the fourth side wall, the laterally transverse axis perpendicular to the longitudinal axis;
a crown extending inwardly with respect to the plurality of side walls and over the bottom wall to establish a melting chamber;
an exhaust port configured to exhaust gas from the melting chamber;
a plurality of baffles including a first baffle and a second baffle, the first baffle coupled to at least one of the side walls of the plurality of side walls and the second baffle coupled to at least one of the side walls of the plurality of side walls, both the first and second baffles disconnected from the crown, wherein the first baffle and the second baffle are in a staggered configuration, the first baffle extending inwardly from at least one of the side walls of the plurality of side walls to which it is coupled and the second baffle extending inwardly from at least one of the side walls of the plurality of side walls to which it is coupled to divide the melting chamber into at least three melting sub-chambers that share the exhaust port;
an inlet configured for introducing a glass batch to the submerged combustion melter;
at least one outlet configured to remove molten glass from the at least three melting sub-chambers; and at least one submerged combustion melting burner configured to provide combustible fuel to the melting chamber, wherein the at least three melting sub-chambers are configured to direct product flow in an undulating flow path between the inlet and the at least one outlet, and wherein the undulating flow path is generally along the longitudinal axis that extends from the first side wall proximate to the inlet to the second side wall proximate to the outlet and is along the laterally transverse axis that extends from the third side wall to the fourth side wall.

26. The submerged combustion melter system of claim 25, wherein at least one of the bottom wall, at least one of the side walls of the plurality of side walls, or the crown is fluid-cooled.

27. The submerged combustion melter system of claim 25, wherein at least one of the bottom wall, at least one of the side walls of the plurality of side walls, or the crown is non-fluid-cooled.

28. The submerged combustion melter system of claim 25, wherein at least one baffle of the plurality of baffles is a non-fluid-cooled baffle.

29. The submerged combustion melter system of claim 28, wherein the non-fluid-cooled baffle includes a refractory material.

30. The submerged combustion melter system of claim 29, wherein the refractory material includes at least one of silicon dioxide or aluminum oxide.

31. The submerged combustion melter system of claim 25, wherein at least one baffle of the plurality of baffles is a fluid-cooled baffle.

32. The submerged combustion melter system of claim 31, wherein the at least one fluid-cooled baffle is configured to receive cooling fluid from at least one of the side walls of the plurality of side walls.

33. The submerged combustion melter system of claim 25, wherein the plurality of baffles further comprises a third baffle coupled to at least one of the side walls of the plurality of side walls, wherein the first baffle and the third baffle are staggered from the second baffle.

34. The submerged combustion melter system of claim 25, wherein all the baffles of the plurality of baffles are disconnected from the crown.

35. The submerged combustion melter system of claim 25, wherein at least one baffle of the plurality of baffles is removable from at least one of the side walls of the plurality of side walls.

36. The submerged combustion melter system of claim 25, wherein the inlet is coupled to and extends through at least one of the side walls of the plurality of side walls or the crown, wherein the inlet is disposed distal from the at least one outlet.

37. The submerged combustion melter system of claim 25, wherein the at least one submerged combustion melting burner is disposed proximate to at least one of the bottom wall or at least one of the side walls of the plurality of side walls.

38. The submerged combustion melter of claim 25, wherein at least one baffle of the plurality of baffles extends partially above a molten glass surface.

39. A submerged combustion melter, comprising:
a bottom wall;
a plurality of side walls including a first side wall, a second side wall, a third side wall, and a fourth side wall extending upwardly from the bottom wall;
a longitudinal axis extending from the first side wall to the second side wall;
a laterally transverse axis extending from the third side wall to the fourth side wall, the laterally transverse axis perpendicular to the longitudinal axis;
a crown extending inwardly with respect to the plurality of side walls and over the bottom wall to establish a melting chamber;
an exhaust port configured to exhaust gas from the melting chamber;
a plurality of baffles including a first baffle and a second baffle, the first baffle coupled to at least one side wall of the plurality of side walls and the second baffle coupled to at least one side wall of the plurality of side walls, both the first and second baffles disconnected from the crown, wherein the first baffle and the second baffle are in a staggered configuration, the first baffle extending inwardly from at least one side wall of the plurality of side walls to which it is coupled and the second baffle extending inwardly from at least one side wall of the plurality of side walls to which it is coupled to divide the melting chamber into at least three melting sub-chambers that share the exhaust port;
an inlet configured for introducing a glass batch to the submerged combustion melter; and
at least one outlet configured to remove molten glass from the at least three melting sub-chambers;
wherein at least one baffle of the plurality of baffles extends partially above a molten glass surface and molten glass flows in a laterally undulated pattern between the inlet and the at least one outlet.

40. The submerged combustion melter of claim 39, wherein at least one of the bottom wall, at least one side wall of the plurality of sidewalls, or the crown is fluid-cooled.

41. The submerged combustion melter of claim 39, wherein at least one of the bottom wall, at least one side wall of the plurality of sidewalls, or the crown is non-fluid-cooled.

42. The submerged combustion melter of claim 39, wherein at least one baffle of the plurality of baffles is a non-fluid-cooled baffle.

43. The submerged combustion melter of claim 42, wherein the non-fluid-cooled baffle includes a refractory material.

44. The submerged combustion melter of claim 43, wherein the refractory material includes at least one of silicon dioxide or aluminum oxide.

45. The submerged combustion melter of claim 39, wherein at least one baffle of the plurality of baffles is a fluid-cooled baffle.

46. The submerged combustion melter of claim 45, wherein the fluid-cooled baffle is configured to receive cooling fluid from the at least one side wall of the plurality of side walls and wherein the cooling fluid includes at least one of water, steam or air.

47. The submerged combustion melter of claim 39, wherein combustion gases from all the melting sub-chambers collect in one exhaust chamber and exhaust from one exhaust port.

48. The submerged combustion melter of claim 39, wherein the plurality of baffles further comprises a third baffle coupled to at least one side wall of the plurality of side walls, wherein the first baffle and the third baffle are staggered from the second baffle.

49. The submerged combustion melter of claim 39, wherein the plurality of baffles is disconnected from the crown.

50. The submerged combustion melter of claim 39, wherein at least one baffle of the plurality of baffles is removable from at least one side wall of the plurality of the side walls.

51. The submerged combustion melter of claim 39, wherein an angle of at least one baffle of the plurality of baffles is adjustable.

52. The submerged combustion melter of claim 39, wherein at least one baffle of the plurality of baffles is coupled to the bottom wall and at least one side wall of the plurality of side walls.

53. The submerged combustion melter of claim 39, wherein the inlet is coupled to and extends through at least one side wall of the plurality of side walls or the crown, wherein the inlet is disposed distal from the at least one outlet.

54. The submerged combustion melter of claim 53, wherein the at least one outlet is coupled to and extends through at least one side wall of the plurality of side walls, wherein the at least one outlet is disposed at least one of at a surface of the molten glass or below the surface of the molten glass, and wherein the at least one outlet is disposed distal from the inlet.

55. The submerged combustion melter of claim 39, wherein the undulating flow path is generally along the longitudinal axis that extends from the first side wall proximate to the inlet to the second side wall proximate to the outlet and is along the laterally transverse axis that extends from the third side wall to the fourth side wall.

56. A submerged combustion melter, comprising:
a bottom wall;
a plurality of side walls including a first side wall, a second side wall, a third side wall, and a fourth side wall extending upwardly from the bottom wall;
a longitudinal axis extending from the first side wall to the second side wall;
a laterally transverse axis extending from the third side wall to the fourth side wall, the laterally transverse axis perpendicular to the longitudinal axis;
a crown extending inwardly with respect to the plurality of side walls and over the bottom wall to establish a melting chamber;
an exhaust port configured to exhaust gas from the melting chamber;
a plurality of baffles including a first baffle and a second baffle, the first baffle coupled to at least one side wall of the plurality of side walls and the second baffle coupled to at least one side wall of the plurality of side walls, both the first and second baffles disconnected from the crown, wherein the first baffle and the second baffle are in a staggered configuration, the first baffle extending inwardly from at least one side wall of the plurality of side walls to which it is coupled and the second baffle extending inwardly from at least one side wall of the plurality of side walls to which it is coupled to divide the melting chamber into at least three melting sub-chambers that share the exhaust port, and wherein an angle of at least one baffle of the plurality of baffles is adjustable;
an inlet configured for introducing a glass batch to the submerged combustion melter; and
at least one outlet configured to remove molten glass from the at least three melting sub-chambers;
wherein the at least three melting sub-chambers are configured to direct product flow in an undulating flow path between the inlet and the at least one outlet.

* * * * *